United States Patent
Lin et al.

(10) Patent No.: US 7,433,544 B2
(45) Date of Patent: Oct. 7, 2008

(54) APPARATUS AND METHOD FOR PRODUCING THUMBNAIL IMAGES AND FOR IMPROVING IMAGE QUALITY OF RE-SIZED IMAGES

(75) Inventors: Zheng Lin, Tokyo (JP); Hiroyuki Tamaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 457 days.

(21) Appl. No.: 10/546,877

(22) PCT Filed: Feb. 25, 2004

(86) PCT No.: PCT/JP2004/002213

§ 371 (c)(1),
(2), (4) Date: Aug. 24, 2005

(87) PCT Pub. No.: WO2004/077357

PCT Pub. Date: Sep. 10, 2004

(65) Prior Publication Data

US 2006/0177152 A1 Aug. 10, 2006

(30) Foreign Application Priority Data

Feb. 26, 2003 (JP) ............................... 2003-049706

(51) Int. Cl.
  *G06K 9/54* (2006.01)
  *G06K 15/00* (2006.01)
  *G09G 5/00* (2006.01)
(52) U.S. Cl. ......................... 382/299; 345/660; 358/1.2

(58) Field of Classification Search ................. 382/254, 382/298–300, 305, 312; 358/1.2, 524, 525, 358/528; 348/137, 207.99; 345/472.1, 698–699, 345/660, 670
See application file for complete search history.

(56) References Cited

U.S. PATENT DOCUMENTS

| | | | | |
|---|---|---|---|---|
| 4,280,143 A | * | 7/1981 | Judd | 358/426.14 |
| 6,545,687 B2 | * | 4/2003 | Scott et al. | 345/629 |
| 6,873,436 B1 | * | 3/2005 | Terada et al. | 358/1.9 |
| 7,194,141 B1 | * | 3/2007 | Bao et al. | 382/254 |
| 2003/0021486 A1 | * | 1/2003 | Acharya | 382/250 |
| 2003/0122952 A1 | * | 7/2003 | Kuroiwa | 348/333.11 |

FOREIGN PATENT DOCUMENTS

| | | |
|---|---|---|
| JP | 9-50514 | 2/1997 |
| JP | 11-161780 | 6/1999 |
| JP | 2000-156779 | 6/2000 |
| JP | 2003-191535 | 7/2003 |
| JP | 2004-112346 | 4/2004 |

* cited by examiner

*Primary Examiner*—Kanji Patel
(74) *Attorney, Agent, or Firm*—Frommer Lawrence & Haug LLP; William S. Frommer; Thomas F. Presson

(57) ABSTRACT

An apparatus and method for improve the image quality of an output image in the size reduction procedure of the resolution conversion process. The apparatus comprises a resolution conversation (RC) unit for down-sizing an original image to a target size image, a RC process controller for controlling an operation of the RC unit so as to repeat a prescribed resolution conversion process twice or more, and a memory for storing an intermediate size image.

11 Claims, 6 Drawing Sheets

APPARATUS AND METHOD FOR PRODUCING THUMBNAIL IMAGES AND FOR IMPROVING IMAGE QUALITY OF RE-SIZED IMAGES

TECHNICAL FIELD

The present invention relates to a method for producing thumbnail images and for improving image quality of re-sized images. The present invention also relates to an apparatus with an image resolution conversion means for converting the resolution of an input image in order to output an image with a reduced size or reduced resolution.

BACKGROUND ART

FIG. 2 shows an example of conventional resolution conversion (RC) process in the most simple form. In FIG. 2, a RC unit 103 converts a resolution of an original image 10 and outputs an image with a target size, i.e. a target size image 20.

In the conventional art, the procedure performed by the RC unit 103 aims to obtain a desired image size as quickly as possible. Accordingly, one step RC procedure is used. In other words, the input image is directly downsized to the target size.

An example of such one step RC procedure is described in Japanese Patent Application Laid-open 2001-160947, Sections 0027 and FIGS. 4 and 7, in which detail procedure for producing a thumbnail image from a typical size image by reducing a resolution of the original image. In this example of the one step RC procedure, a thumbnail image is produced from an original image by reducing the horizontal and vertical size to ¼. More specifically, one pixel is sampled in every four pixels in the horizontal direction, and one line is sampled in every four lines in the vertical direction.

DISCLOSURE OF INVENTION

However, in the conventional art, there is not much attention paid to image quality of the resolution-converted image, which is an output of the RC unit 103. More specifically, there is no consideration for improving the image quality of an output image with a smaller size converted from an input image with a larger size.

For the one step RC process, if a large ratio difference exists between the original image and the output image, substantial amount of information associated with the original image may be lost during the size reduction procedure of the RC process, thereby resulting a lower image quality of the output image. One of reasons causing such a lower image quality is that the space continuity of adjacent pixels in the original image is lost in the corresponding adjacent pixels in the output image.

That is, from the view of human eye, the output image appears to have discontinuity and/or distortion in an image. For example, if the image is taken in an office and down-sized, straight line parts such as edges of desks or walls would appears jaggy and smoothness of outlines may be lost. If the conventional RC process is used, the image quality of a thumbnail image that is down-sized from a 2 M pixel (1600×1200) image appears to be worse than that of a thumbnail that is resolution-converted from a Video Graphic Array (VGA) size (640×480) image even both of them have same content.

The present invention is made in view of the above-described situation related to the conventional art. It is desirable to provide a method that can improve the image quality of an output image in the size reduction procedure of the resolution conversion process.

Furthermore, it is desirable to provide an apparatus with a resolution conversion means for converting the resolution of an input image so as to output an image with a reduced size and a higher image quality.

Furthermore, it is desirable to provide an apparatus with a means for converting resolution of the original image to output a smaller size image while preserving image information associated with the original image as much as possible even if a larger size-reduction ratio is used.

Furthermore, it is desirable to provide a method for converting resolution of the original image to output a smaller size image while utilizing an existing resource of the resolution conversion as much as possible.

According to an embodiment of the present invention, an apparatus having a resolution conversion unit for down-sizing an original image to a target image is provided. The apparatus includes a controller unit for controlling an operation of the resolution conversion unit so as to repeat a resolution conversion process twice or more, and a memory unit for storing an intermediate image that is produced as an result of the resolution conversion process. In the apparatus of the present embodiment, the target image is produced by down-sizing the intermediate image in the last resolution conversion process performed.

In the present embodiment, the intermediate image, which is outputted from the resolution conversion unit in a current cycle of the resolution conversion process and stored in the memory unit, may be inputted to the resolution conversion unit in the ensuing cycle of the resolution conversion process and down-sized therein.

The controller unit may determine a size of the intermediate image and/or the number of repetition of the resolution conversion process in accordance with a conversion ratio required for converting the original image to the target image.

It is preferable that a size of the intermediate image may be set to a Video Graphic Array (VGA) image size if the original image has a size larger than the VGA image size and the target image is a thumbnail image.

According to another embodiment of the present invention, the controller unit may control the resolution conversion unit so as to perform the resolution conversion process once or a plural times, and determine the number of times at which the resolution conversion process is performed in accordance with a conversion ratio required for converting the original image to the target image.

According to still another embodiment of the present invention, the apparatus may further include means for detecting a type of the original image. In the present embodiment, the controller unit may determine at least one of the number of the repetition and a size of the intermediate image in accordance with a detected type of the original image.

According to yet another embodiment of the present invention, the apparatus may further include means for detecting a user input. In the present invention, the controller unit may determine at least one of the number of the repetition and a size of the intermediate image in accordance with a detected user input.

According to another embodiment of the present invention, the resolution conversion unit may include a plurality of elemental resolution conversion units, which perform resolution conversion algorithms different from each other. In the present embodiment, the controller unit may select one of the resolution conversion algorithms to be used in the resolution conversion process.

According to another embodiment of the present invention, a camcorder including an image capturing unit, a display unit and a resolution conversion unit for re-sizing an original image to a target image is provided. The camcorder includes a controller unit for controlling an operation of the resolution conversion unit so as to repeat a resolution conversion process twice or more, and a memory unit for storing an intermediate image that is produced as a result of the resolution conversion process. In the present embodiment, the target image is produced by down-sizing the intermediate image in the last resolution conversion process performed, the original image is outputted from the image capturing unit, and a plurality of the target images are displayed on the display unit.

According to still another embodiment of the present invention, a method for utilizing a resolution conversion means for down-sizing an original image to a target image is provided. In the method, an operation of the resolution conversion means is controlled so as to repeat a resolution conversion process twice or more for the down-sizing, and an intermediate image that is produced as a result of the resolution conversion process is stored. In the present embodiment, the target image is produced by down-sizing the intermediate image in the last resolution conversion process performed.

According to yet another embodiment, a method for improving the output image quality in the procedure of down-sizing a size of digital image is provided. As described in the previous section, the conventional resolution conversion process of the down-sizing a size of digital image has a problem that, if a large size difference exists between an original image (input image) and an target image (output image), discontinuity and visual distortion may be found in the output image. The method according to the present embodiment replaces this conventional resolution conversion procedure, in which the target image is directly obtained from the input image through a single resolution conversion process, with a novel two-step resolution conversion process.

The two-step resolution conversion process according to the present embodiment utilizes an intermediate image with an appropriate size between the original image and the target image, and makes the intermediate size as the output of the first time resolution conversion process and as the input of second time resolution conversion process. As the result, the two-step resolution conversion allows to reduce the input-to-output size difference in each resolution conversion process.

By reducing the input-to-output size difference in each resolution conversion process, more information of the input image may be kept and reflected to the output image. The method according to the present embodiment provides solutions to the problem of the visual discontinuity and image quality degradation in the output image when down-sizing a large size image to a very small size image.

The method according to the present embodiment may also be repeated more than twice so that the size difference between the input image and the output image is lowered to a more appropriate value for each of the resolution conversion processes. By repeating the resolution conversion process more than twice, the output image quality may further improved than the two-step resolution conversion process and the conventional one-step resolution conversion process in which the resolution conversion process is performed once. This method may also be applicable for cases in which the size difference between the original image and the target image is too large and the conventional one time of two-step RC is not enough.

BEST MODE FOR CARRYING OUT THE INVENTION

Embodiments of the present invention are described with reference to figures.

Figure 1:
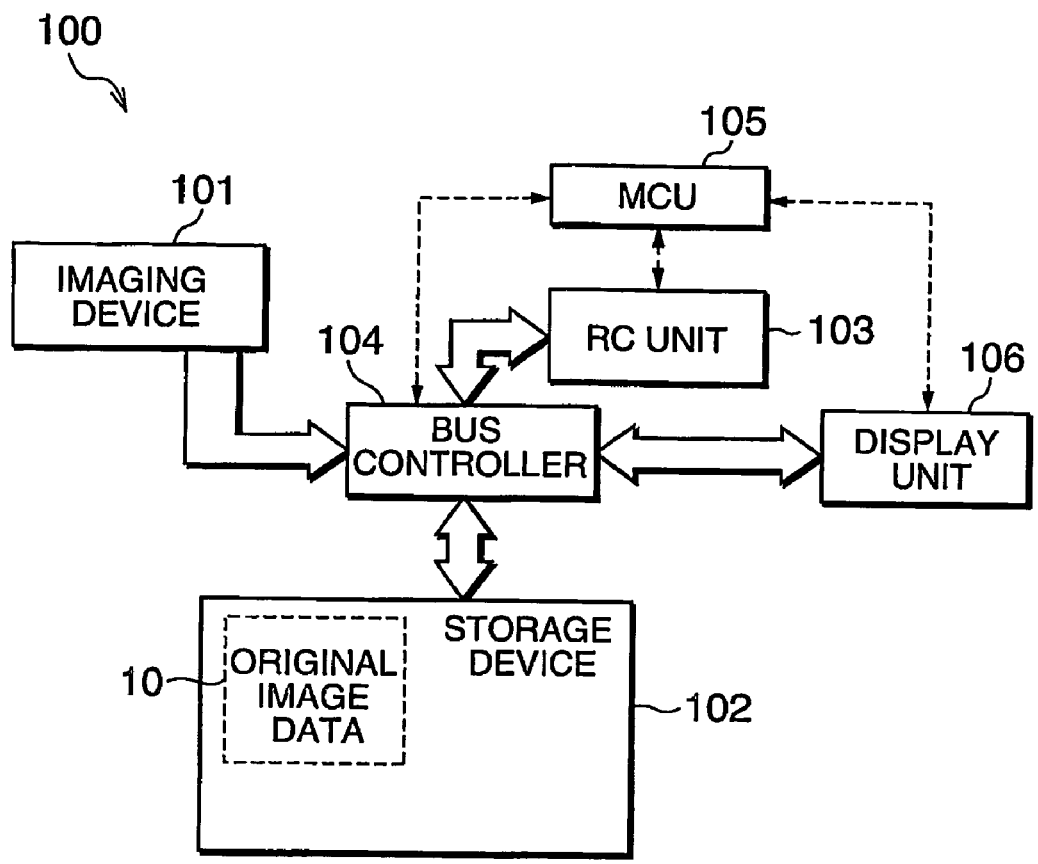
FIG. 1 is a block diagram showing an example of a system that operates in accordance with the present invention.

A system 100 in accordance with an embodiment of the present invention has, for example, a configuration as shown in FIG. 1. The system 100 may be a digital camcorder or a digital camera or any other apparatus having resolution conversion means according to the present invention. As shown in FIG. 1, the system 100 includes an imaging device 101, a storage device 102, a resolution converter unit (RC unit) 103, a bus controller 104, a micro controller unit (MCU) 105 and a display unit 106.

The imaging device 101 is a means for capturing image such as CCD. The storage device 102 is memory for storing an original image 10 to be converted by the RC unit 103 and/or any other data, and may include an internal RAM or a removal storage medium. The MCU 105 controls other devices and units included in the system 100.

The RC unit 103 converts a resolution of an input image and outputs an output image with a different size. More specifically, the RC unit 103 enlarges or reduces the size of the input image to a desired size. The RC unit 103 may be implemented by software, hardware or joint function of hardware and software. The RC unit 103 may be an independent unit or belong to an image-processing unit provided in the system 100. For example, the RC unit 103 may be realized by an image processing IC or CPU or the MCU 105 that execute a software program for performing procedures of resolution conversion (RC) process. Alternatively, the RC unit 103 may be realized by a hardware logic circuit performing the procedures of RC process. Specific examples of the RC process will be described in the later section of the present specification.

The bus controller 104, which functions in the same way as a memory controller, controls input and output of data path or bus in response to a control signal provided from the MCU 105. For example, the bus controller 104 controls a flow of image data among the imaging device 101, the storage device 102, the RC unit 103 and the display unit 106.

The display unit 106 displays the original image data captured by the imaging device 101 or stored in the storage device 102, and image data converted by the RC unit 103. Alternatively, in the system 100, the display unit 106 may be replaced with a communication unit for transmitting image data to display the image in an external display apparatus.

The RC process is implemented in the system 100 in the following manner. First, video signal from the imaging device 101 or image data stored in the storage device is inputted into the RC unit 103 for the resolution conversion under the control of the bus controller 104. After the resolution conversion, output image data is either sent again to the storage device 102 for later processing or sent to the display unit 106 for display. The output path is also controlled by the MCU 105. The MCU 105 functions to control all the flow described above.

Figure 2:
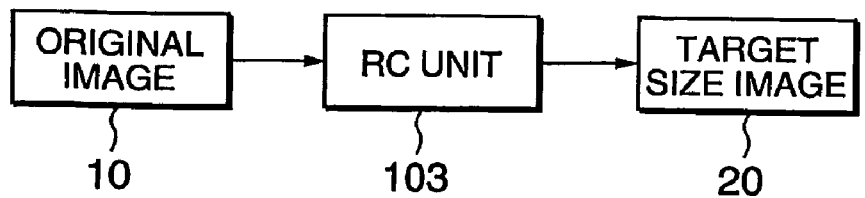
FIG. 2 is a schematic diagram showing a conventional one-step resolution conversion process.

As described above, in the conventional art, the RC unit 103 is used directly as shown in FIG. 2. In other words, the data of the original image 10 with a certain size is read out from a source, which may be the imaging device 101 or the storage device 102, and is input into the RC unit 103. Then, the data is down-sampled in the RC unit 103 and is transformed to another size, and output as the target size image 20.

In this scheme of the conventional art, there may be a shortcoming. That is, if a ratio of the input image size and the output image size is large, for example, if an input image of 1600 (H)×1200 (V) pixel size is to be converted into a small output image of 320 (H)×240 (V) pixel size, the image quality of the output image may be greatly degraded, compared to that of the original image. The reason is due to one of the basic principles of the RC process when the image is resized.

Typically, the RC process is implemented for the resizing by re-sampling pixels of the original image. The pixels of the original image are input and processed by a certain filter. Then, the result of filtering forms the output image. Each pixel of the output image is made from a weighted average of a plurality of the pixels in the original image.

The difficulty in resizing and, in particular, reducing the image size is how to preserve as much of the source information associated with the original image as possible under the limitation of the certain filter.

When the original image is transmitted to the RC unit 103 on a line-by-line basis, the filter included in the RC unit 103 for a line processing is widely used in the RC process for the resizing. An example of resizing single line is described as below.

Figure 3A:
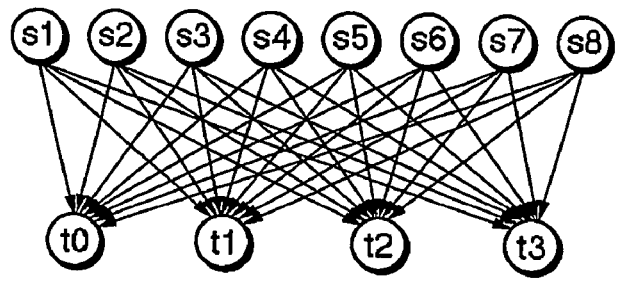
FIG. 3A is schematic illustration of an example of an ideal RC process for resizing, in which each of target pixels features information from all of original pixels.

In an ideal RC process, which is shown as in FIG. 3A, all pixels s1-s8 in a line S of the original image are taken into account when making the new pixels t0-t3 in a line T for the output image. It should be noted that the numbers of the pixels contained in each of lines shown in FIGS. 3A-3D are determined for the purpose of explanation, and the numbers of the pixels contained in actual lines of the image are not limited to any of these values in the present invention.

In the FIG. 3A, the line S is resized to the line T. Each of the pixels t0, t1, . . . t3 in the line T is a weighted-average of all the pixels s1, s2, . . . s8 in the line S. In other words, each of pixels s1, s2, . . . s8 in the line S contributes to the value of each of the pixels t0, t1 . . . t3 in the line T. This relation can be expressed as:

$$Tn = \sum_{i=1}^{8} Kn,i * Si$$

$$n = 1, 2, 3, 4$$

where Tn is a value of each pixel in the line T;
Si is a value of each pixel in the line S; and
Kn,i is a weighted coefficient representing how much contribution each pixel Si makes to each pixel Tn.

Figure 3B:
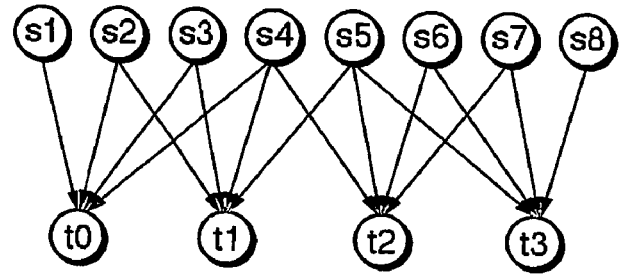
FIG. 3B is schematic illustration of an example of a practical RC process with a filter, in which each of target pixels can only use information from part of original pixels.

A different combination of coefficient forms the filter with different performance. However, in order to implement such an ideal filter for resizing a high resolution image that contains a large number of pixels in each line, a memory/storage with a large capacity is required to store all the pixels of each line. Such a large memory/storage may be expensive and impractical to implement Accordingly, the most practical filters use a memory/storage with a limited size. One example is shown in FIG. 3B. In the instant example, each of target pixels t0, t1, . . . t3 is made from a limited length of the original pixels. In the instant example, only four of the original pixels are used to produce one target pixel. For example, the target pixel to is calculated from the original pixels s1, s2, s3, s4, the target pixel t1 is calculated from the original pixels s2, s3, s4, s5, and so on.

One of possible shortcoming of the RC process for the resizing shown in FIG. 3B is that the target pixel cannot use full of the source information due to the size limit of the memory/storage.

Figure 3C:
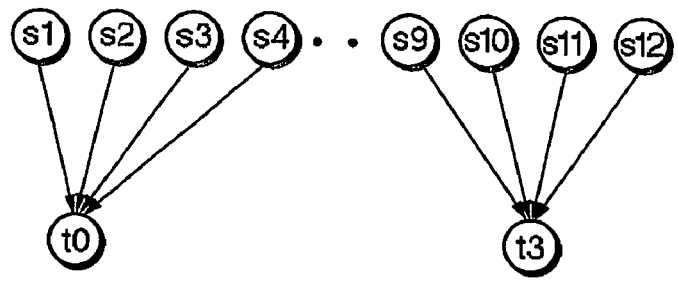
FIG. 3C is schematic illustration of an example of an extreme condition in the practical RC process, in which each of target pixels can only use a half of the information from original pixels due to a large size difference between input and output.

Another example of the RC process for the resizing is shown in FIG. 3C. In the instant example, a large size image is converted to a very small size. That is, a line S, which is comprised of 12 pixels s0, s1, . . . s12, is resized to a line T, which contains only two pixels t0 and t3. In this example, the pixel to is calculated only by using the first four pixels of the original image, i.e. the source information, while the pixel t3 only use the last four pixels of the original image. Other pixels contribute nothing to the output image. Therefore, in the output image, a large quantity of the source information is lost. From the view of human eye, the image quality of the output image is degraded, and the output image appears to have discontinuities and visible distortion therein.

To alleviate or resolve the shortcoming related to the RC process in the conventional art, the present invention proposes a two-step resolution conversion (RC) method. The principle of the two-step RC method is illustrated in FIG. 3D.

Below, an example of the two-step RC method according to an embodiment of the present invention is described. In the instant example, it is assumed that the original image is resized on the line-by-line base. In the two-step RC method, when a line containing a large number of pixels is resized to a line with a very small number of pixels, the line of the original image (line S) is resized to an intermediate line C, and the intermediate line C is resized to the target image line T. The intermediate line C has an intermediate number of pixels, which is less than the number of the original image line S but more than the target image line T.

Figure 3D:
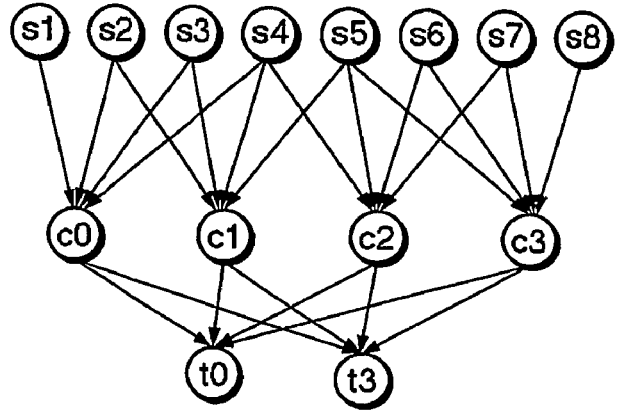
FIG. 3D is schematic illustration of an example of a two-step RC process according to the present invention, in which target pixels of the final output can use as much source information as possible by adding an intermediate re-sampling phase.

As shown in FIG. 3D, pixels c0, c1, . . . c3 of the intermediate line C are obtained from the pixels s1, s2, . . . s8 of the original image line S by the resizing procedure. In this procedure, almost all the pixels of the original image line S make contribution to corresponding pixels of the intermediate line C. That is, the pixels c0, c1, . . . c3 of the intermediate line C preserve as much of the source information associated with the original image as possible.

Furthermore, when the pixels t0, t1, ... t3 of the target image line T are produced by resizing the intermediate line C, because the ratio difference is much smaller compared with the case in which the original image line S is directly resized to the target image line T, the pixels t0, t1, ... t3 can use as much of information associated with the pixels c1, c2, ... c3 of the intermediate line C as possible. As the result, in the final output, which is the target image consisting of a prescribed number of the target image lines T, much more source information associated with the original image can be preserved than directly resizing the original image to the final output.

According to the two-step RC process for the resizing shown in FIG. 3D, from the view of human eye, the discontinuity in the outputted target image becomes much less than the conventional resizing method, and the resulting image quality looks much better than the conventional resizing method.

Figure 4:
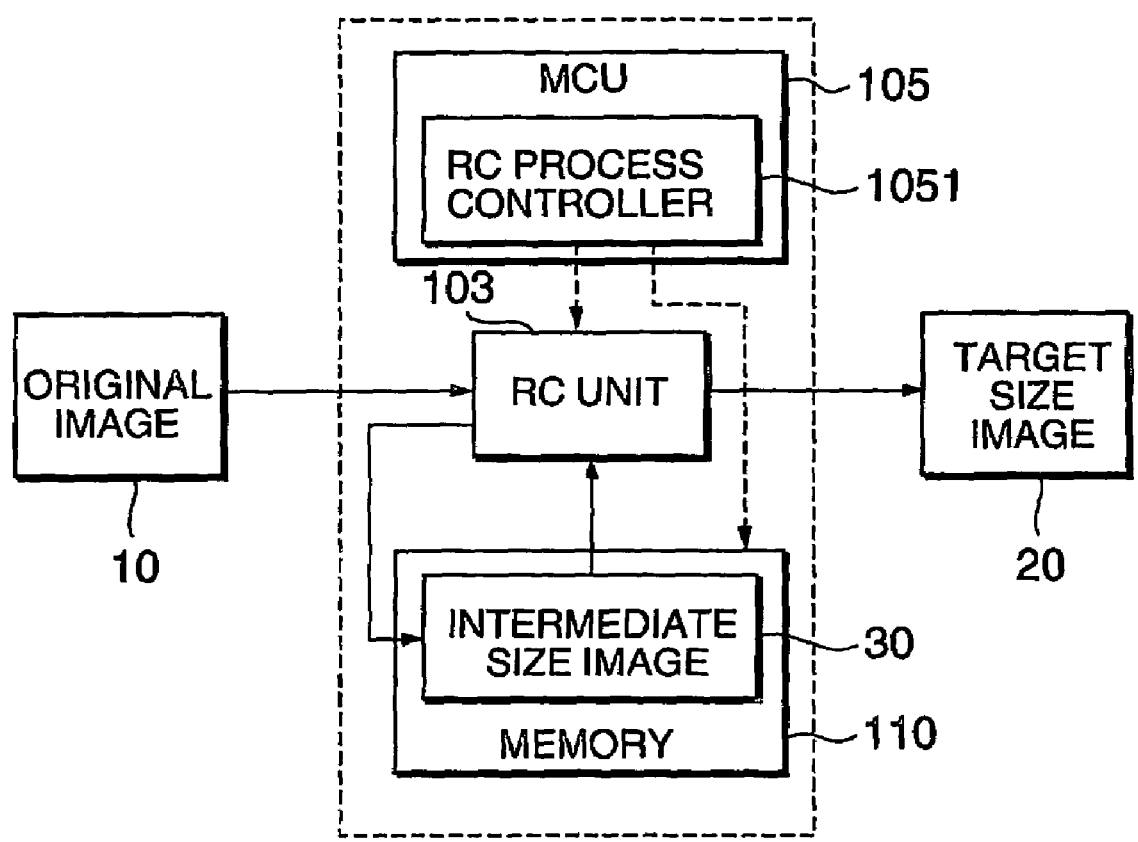
FIG. 4 is a block diagram of an example of configuration that performs the RC process according to embodiments of the present invention.

FIG. 4 shows an example of configuration only related to the two-step RC process in accordance with the present embodiment. In the present embodiment, a RC process controller 1051 is provided in the MCU 105 for controlling procedures of the two-step RC process. The RC process controller 1051 controls the RC unit 103 and a memory 110 so as to realize the two-step RC process described above. The memory 110 may be an internal RAM of the present system 100, or a buffer or any memory means provided in the system 100 as long as such memory means can temporary store an intermediate size image 30 outputted from the RC unit 103.

Figure 5:
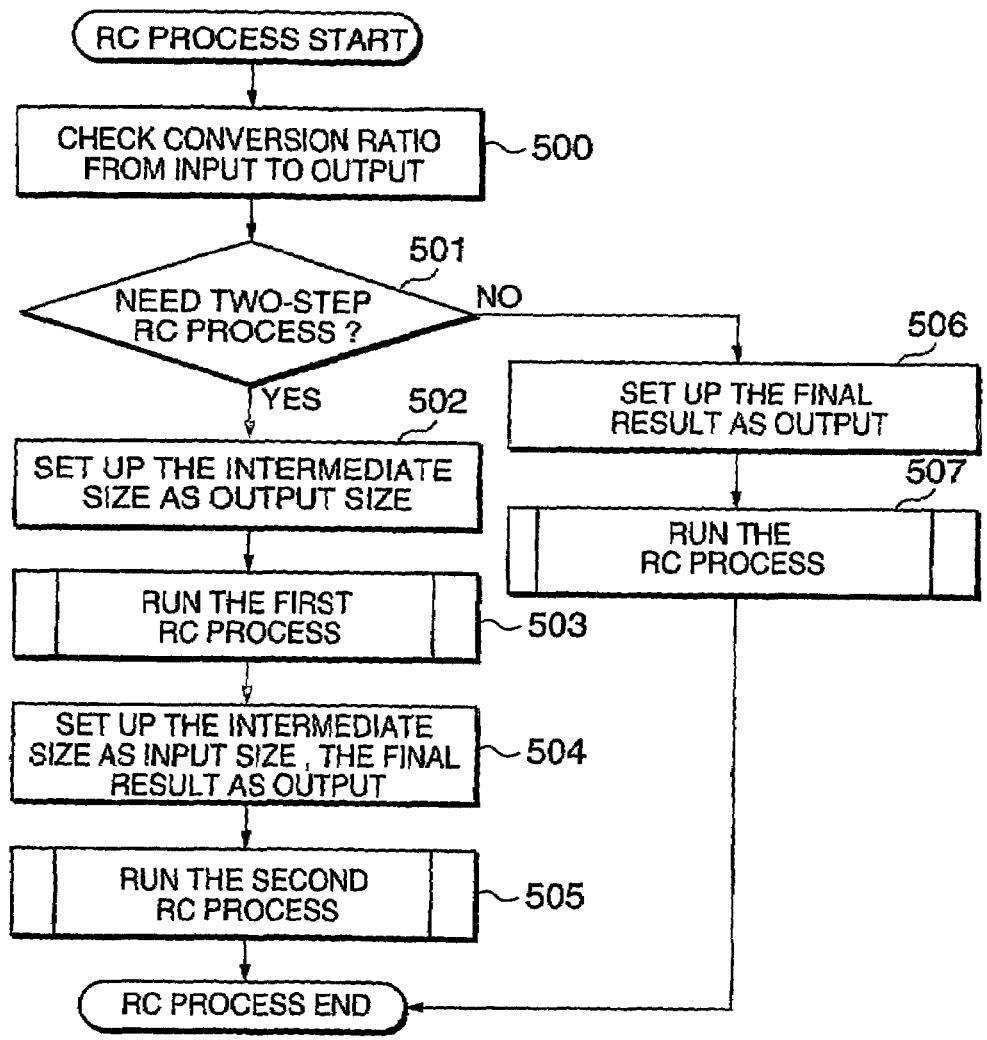
FIG. 5 is a flow diagram of the two-step RC process according to one embodiment of the present invention.

Procedures of the two-step RC process performed by the configuration shown in FIG. 4 are described below with reference to a flow chart shown in FIG. 5.

In Step 500, before the resizing of an image, a size of the original image 10 and a size of the target size image 20 are checked. If a conversion ratio required for converting the input image to the output image, i.e., a difference ratio between the original image 10 and the target size image 20 reaches a predetermined value, it is determined that the two-step RC process is appropriate (Yes in Step 501), and the actual resizing procedure of the two-step RC process is initiated. If not (No in Step 501), the conventional RC process is performed (Steps 506, 507).

In typical cases in which the resizing is performed in the line-by-line base as described in the above example, such a predetermined valued may be designated as less than ½ for either H direction or V direction, or less than ¼ for the whole area.

In the first part of the two-step RC process, the original image 10 having a size A is inputted into the RC unit 103 similarly as in the conventional RC process, but at this time, an image to be outputted from the RC unit 103 and stored in the memory 110 is an intermediate size image 30, which is designated by the RC process controller 1051 (Steps 502, 503).

A size or resolution of the intermediate size image 30 may be a fixed value for predetermined resolution conversion patterns. For example, if an image of 1 M pixel or a larger size is to be converted to an image having a size smaller than the VGA size (480×640 pixels), the VGA size may be selected as the size of the intermediate size image 30. More specifically, in the case of making a thumbnail image with 160×120 (H×V) pixels as the target size image 20 from a large size of the original image 10 such as 1M pixel, 1.5 M pixel or 2 M pixel, the intermediate size may be set at the VGA size. The original image is firstly down-sized to the VGA size image, and then this VGA size image is down-sized to the thumbnail image.

The size of the intermediate size image 30 may either be automatically calculated according to the difference ratio (the conversion ratio) between the size of the original image 10 and the final output size (the size of the target size image 20). Alternatively, the size of the intermediate size image 30 may be a fixed value that is determined before the present two-step RC process is started.

In second part of the two-step RC process (Steps 504, 505), the intermediate size image 30 stored in the memory 110 is input into the RC unit 103 again. However, in this time, the size of an image to be outputted from the RC unit 103 is set for the final result, i.e. the size of the target size image 20.

By repeating the resizing procedures of the RC process two times, the conversion ratio from the input size to the output size is reduced gradually at each time. Accordingly, in each time, each pixel of the output image may preserve as much of the source information as possible from the pixels of the input image. As the result, the image quality of the final output, which is the target size image 20 in the present example, may be greatly improved in comparison with the conventional RC process.

Another embodiment of the present invention is described below. According to the present embodiment, a multi-step RC process is provided. In the multi-step RC process, the resizing procedure of the RC process is repeated more than twice.

Figure 6:
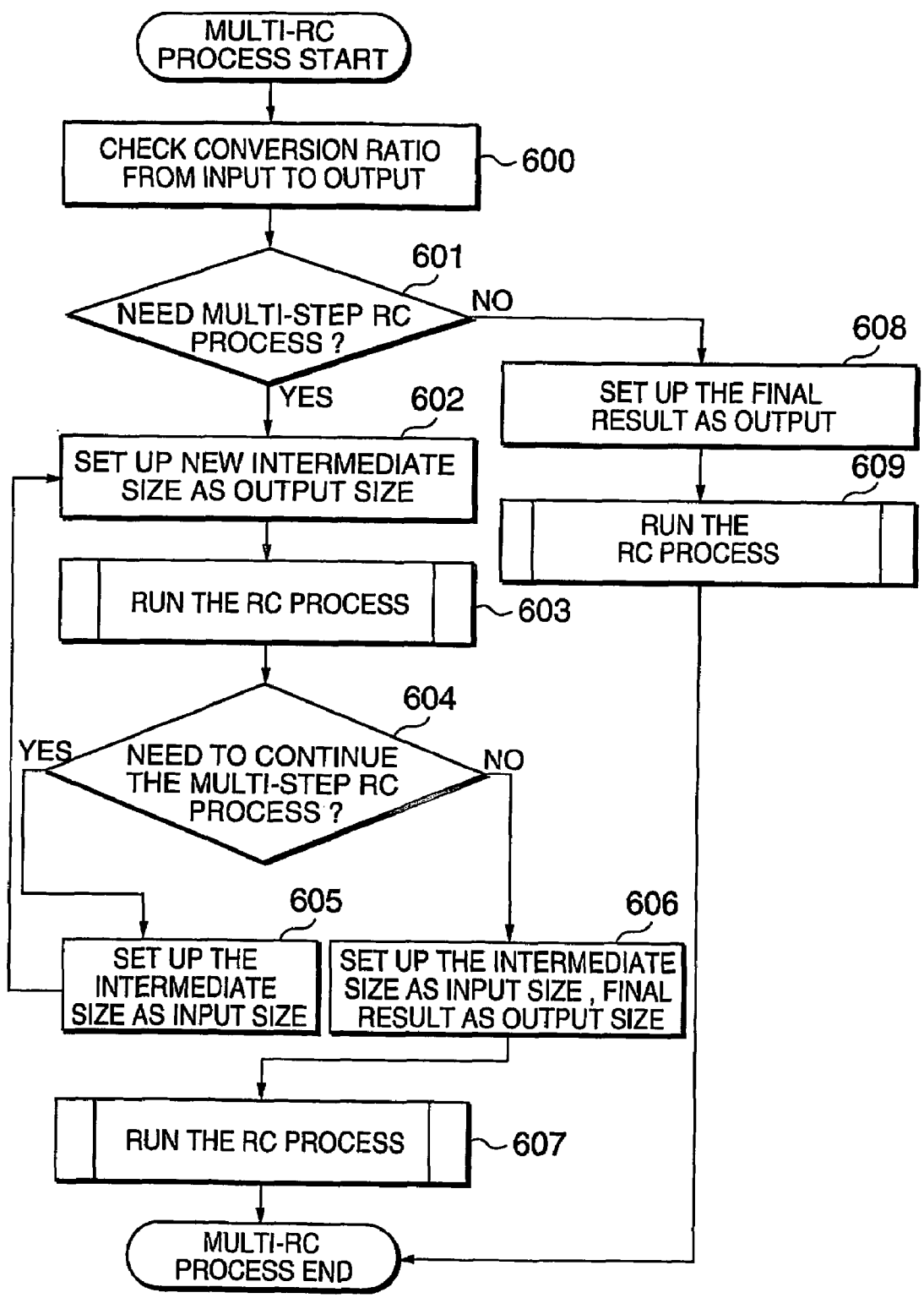
FIG. 6 is a flow diagram of a multi-step RC process according to one embodiment of the present invention.

The procedure of the multi-step RC process is described below with reference to FIG. 6, which shows an example of process flow in the multi-step RC process.

In Steps 600, 601, a conversion ratio from the original image 10 to the target size image 20 is checked if it reaches a predetermined value, and, in response to the check result, either the multi-step RC process or the conventional RC process (Steps 608, 609) is performed.

For the multi-step RC process, the predetermined value of the conversion ratio used in the check may be less than ⅓ either in H or V direction, or less than ⅑ for the whole area.

In steps 602 and 603, a value of the intermediate size to be used for the output image from the RC unit 103 is determined, and this value is used as an output size of the RC unit 103. The current value of the intermediate size will be used as an input size in Steps 605 and 606.

During the procedure of the multi-step RC process, several intermediate sizes are calculated, and in each time, one of the mediate sizes is used for the output size of the current RC process cycle and the input size for the ensuing RC process cycle.

The sizes of the intermediate size image 30 may either be automatically calculated according to the conversion ratio from the original image 10 and the target size image 20. Alternatively, the sizes of the intermediate size image 30 may be fixed values with a constant increment between adjacent size values. The sizes of the intermediate size image 30 may be calculated during the multi-step RC process or in advance.

For example, if the original image is 1600×1200 size and the target size image is in 320×240 size, the intermediate sizes may be determined as 1152×864 for the first time, and 640×480 for the second time. For another example, the first intermediate size can be set up as the biggest one in the range of the output of the resolution conversion unit provided in the current system, and less than the original image size.

In step 604, the current intermediate size is checked if more than one cycle of the multi-step RC process is needed to obtain the final result of the target size image 20. If needed (Yes in Step 604), the current intermediate size is set as the input size of the RC unit 103 (Step 605), and the process returns to Step 602.

If only one cycle of the multi-step RC process is needed (No in Step 604), the current intermediate size is set as the input size and the size of the target size image is set as the output size of the RC unit 103 (Step 606), and the final cycle of the RC process is performed (Step 607).

By utilizing the multi-step RC process, the output image quality may be improved in comparison with the conventional case. The multi-step RC process is particularly effective when the conversion ratio or the size difference between the original image and the target size image is large.

Figure 7:
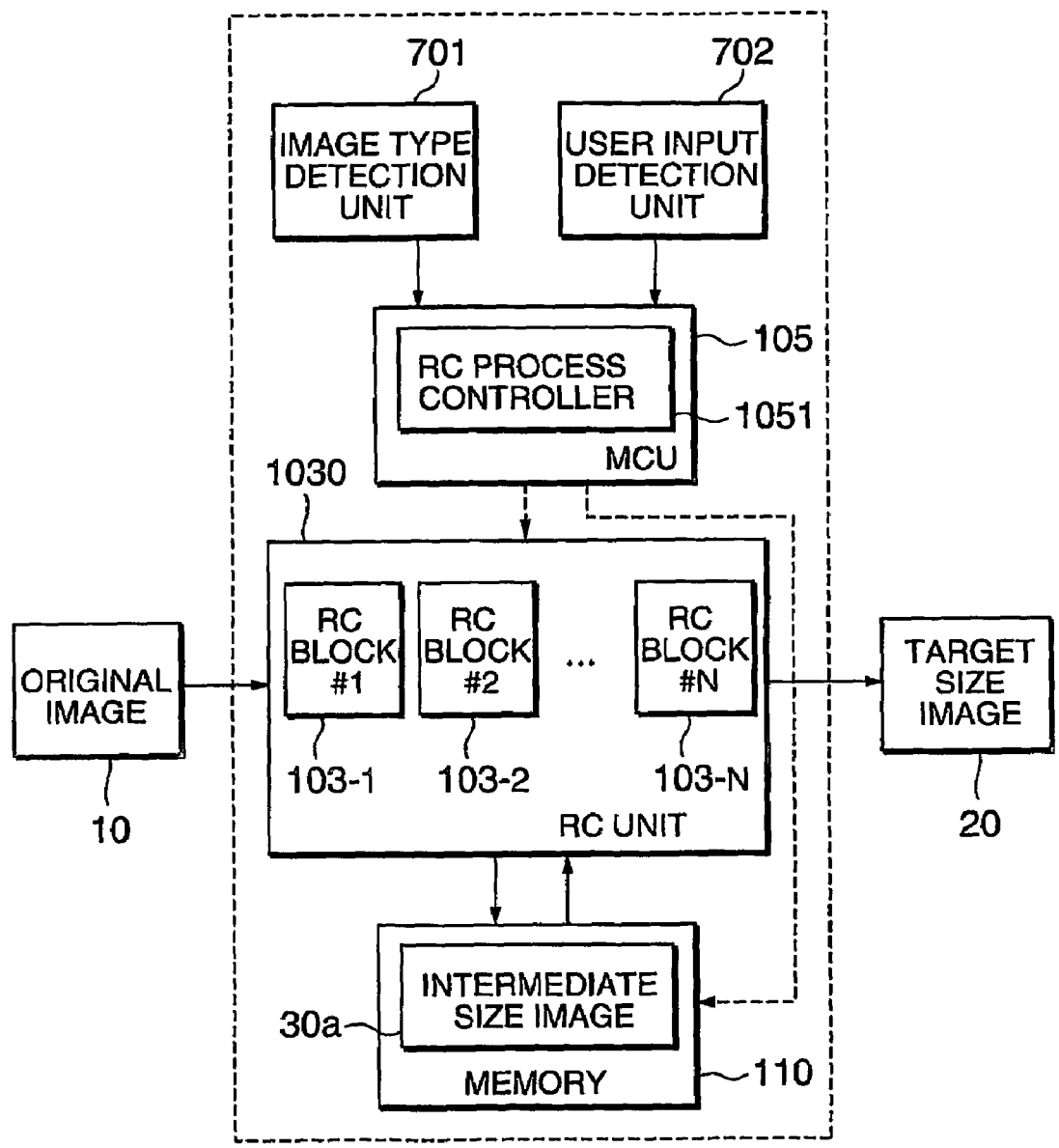
FIG. 7 is a block diagram of an example of configuration that performs the RC process according to another embodiment of the present invention.

Another embodiment of the present invention will be described below with reference to FIG. 7. FIG. 7 shows only parts of the system 100, relating to the RC process of the present embodiment. The same devices and units as in the system 100 shown in FIG. 1 are not described here.

In the present embodiment, the RC unit 103 of the system 100 is replaced with a RC unit 1030 that consists of a plurality of RC block #1 (103-1), RC block #2 (103-2), . . . RC block #N (103-N). Each of the RC blocks included in the RC unit 1030 performs different resolution conversion process with different RC algorithms and/or different filters such as Cubic, Hanning, Hamming, Lanczos etc. FIR filters.

The system 100 further includes a image type detection unit 701 for detecting a type of the original image to be resized, and a user input detection unit 702 for detecting a user input operation for selecting which RC algorithm should be performed and/or which of the RC units should be used. For example, the image type detection unit 701 may be realized by image recognition means that can detect a content type of the image and provide a base of judgment for the RC process controller 1051 for determining whether the multi-RC process should be used or not. The image type detection unit 701 may detect a size and/or resolution of the original image, and/or if the image is in portrait mode or landscape mode.

The user input detection unit 702 may include a touch panel or a key board or various types of switches placed on a body of the system 100. Alternatively, the user input detection unit 702 may be used as the image type detection unit 701 to detect a user preference on the type of the original image.

In the present embodiment, a type of the original image 10 to be resized is detected by the image type detection unit 701, and the RC process to be used for the resizing is selected in response to a detected image type. The type may be determined according to content of the original image or any other information related to the original image.

For the RC process selection, for example, one of the RC blocks 103-1, 103-2, . . . 103-N is selected for selecting specific RC algorithm to be used in the RC process. Furthermore, for the RC process selection, either one of the conventional one-step RC process, the two-step RC process or the multi-step RC process, which are described above with FIG. 5 and FIG. 6, is selected.

Furthermore, in the present embodiment, a user input detected by the user input detection unit 702 is used for the RC process selection. Both or one of the user input and the image type may be used for the RC process selection.

Furthermore, in the present embodiment, the size of intermediate size image 30 may be directly determined according to the user input or the image type or in conjunction with the RC process selection described above.

Although the embodiments of the present invention are described for the system 100 with the configuration shown in FIG. 1, the present invention may be applicable to any other system or apparatus as long as it include a means of the resolution conversion. The resolution conversion process according to the present invention may be used before or after or during any type of image processing performed in such system or apparatus. The image processing may include compression/decompression, coding/decoding, or, encryption/decryption. Furthermore, the resolution conversion process according to the present invention may be performed on the entire image data or sequentially performed on parts of the image data. Furthermore, the resolution conversion process according to the present invention may be performed on any type of images such as still images or a part of moving picture images.

According to the embodiments of the present invention, the image quality of down-sized image may be greatly improved while effectively utilizing an existing RC software and/or hardware resource. Particularly, the RC process according to the embodiments of the present invention works effectively when an image of a very large size is resized to a small target size image.

Compared with the conventional case, the RC process according to the embodiments of the present invention can preserve much more source information of the original image, and reduce the discontinuity in an target size image. For example, the improvement is obvious in an application of making a thumbnail size image from a large size image.

Furthermore, the RC process according to the embodiments of the present invention is simple and easy to implement, and does not change existing RC algorithm or hardware.

While the present invention has been particularly shown and described with reference to preferred embodiments according to the present invention, it will be understood by those skilled in the art that any combinations or sub-combinations of the embodiments and/or other changes in form and details can be made therein without departing from the scope of the invention.

INDUSTRIAL APPLICABILITY

According to the present invention, a method and apparatus that can improve the image quality of a down-sized image in the RC process are provided.

Furthermore, according to the present invention, a method and apparatus that can perform the RC process while preserving image information associated with the original image as much as possible even if a larger size-reduction ratio is used.

The invention claimed is:

1. An apparatus having a resolution conversion unit for down-sizing an original image to a target image, the apparatus comprising:
    a controller unit for controlling an operation of the resolution conversion unit to repeat a resolution conversion process twice or more; and
    a memory unit for storing an intermediate image that is produced as an result of the resolution conversion process,
    wherein the target image is produced by down-sizing the intermediate image in the last resolution conversion process performed, and
    wherein a pixel of a down-sized image contains information of a predetermined number of pixels of an image before being down-sized, the predetermined number of pixels being determined based on the position of the pixel and a conversion ratio between the down-sized image and the image before being down-sized.

2. The apparatus according to claim 1, wherein:
    the intermediate image, which is outputted from the resolution conversion unit in a current cycle of the resolution conversion process and stored in the memory unit, is inputted to the resolution conversion unit in the ensuing cycle of the resolution conversion process and down-sized therein.

3. The apparatus according to claim 1, wherein:
the controller unit determines a size of the intermediate image in accordance with a conversion ratio required for converting the original image to the target image.

4. The apparatus according to claim 3, wherein:
the controller unit determines the number of repetition of the resolution conversion process in accordance with the conversion ratio.

5. The apparatus according to claim 1, wherein:
a size of the intermediate image is equal to a Video Graphic Array (VGA) image size if the original image has a size larger than the VGA image size and the target image is a thumbnail image.

6. The apparatus according to claim 1, wherein:
the controller unit controls the resolution conversion unit to perform the resolution conversion process once or, and determines the number of times at which the resolution conversion process is performed in accordance with a conversion ratio required for converting the original image to the target image.

7. The apparatus according to claim 1, further comprising:
means for detecting a type of the original image,
wherein the controller unit determines at least one of the number of the repetition and a size of the intermediate image in accordance with a detected type of the original image.

8. The apparatus according to claim 1, further comprising:
means for detecting a user input,
wherein the controller unit determines at least one of the number of the repetition and a size of the intermediate image in accordance with a detected user input.

9. The apparatus according to claim 1, wherein:
the resolution conversion unit includes a plurality of elemental resolution conversion units, which perform resolution conversion algorithms different from each other, and
the controller unit selects one of the resolution conversion algorithms to be used in the resolution conversion process.

10. A camcorder including an image capturing unit, a display unit and a resolution conversion unit for re-sizing an original image to a target image, the camcorder comprising:
   a controller unit for controlling an operation of the resolution conversion unit to repeat a resolution conversion process twice or more; and
   a memory unit for storing an intermediate image that is produced as an result of the resolution conversion process,
   wherein the target image is produced by down-sizing the intermediate image in the last resolution conversion process performed,
   wherein the original image is outputted from the image capturing unit, and a plurality of the target images are displayed on the display unit; and
   wherein a pixel of a down-sized image contains information of a predetermined number of pixels of an image before being down-sized, the predetermined number of pixels being determined based on the position of the pixel and a conversion ratio between the down-sized image and the image before being down-sized.

11. A method for utilizing a resolution conversion means for downsizing an original image to a target image, the method comprising the steps of:
   controlling an operation of the resolution conversion means to repeat a resolution conversion process twice or more for the down-sizing; and
   storing an intermediate image that is produced as an result of the resolution conversion process,
   wherein the target image is produced by down-sizing the intermediate image in the last resolution conversion process performed, and
   wherein a pixel of a down-sized image contains information of a predetermined number of pixels of an image before being down-sized, the predetermined number of pixels being determined based on the position of the pixel and a conversion ratio between the down-sized image and the image before being down-sized.

* * * * *